United States Patent [19]

Hideo et al.

[11] Patent Number: 5,751,516
[45] Date of Patent: May 12, 1998

[54] NON-MAGNETIC SUBSTRATE MATERIAL AND SLIDER ASSEMBLY FOR USE IN FLYING-TYPE MAGNETIC HEAD

[75] Inventors: Nitta Hideo; Soutome Tomoki, both of Mooka; Shimizu Yoshiro, Utsunomiya, all of Japan

[73] Assignee: Hitachi Metals, Ltd., Tokyo, Japan

[21] Appl. No.: 670,340

[22] Filed: Jun. 25, 1996

[30] Foreign Application Priority Data

Jun. 28, 1995 [JP] Japan ................... 7-184705

[51] Int. Cl.$^6$ ................................... G11B 5/60
[52] U.S. Cl. ........................................ 360/103
[58] Field of Search ............................ 360/102–103

[56] References Cited

U.S. PATENT DOCUMENTS 4,636,433  1/1987  Kubo et al. ...................... 360/134
4,673,996  6/1987  White ............................... 360/103

FOREIGN PATENT DOCUMENTS 61-146751   7/1986   Japan .
1-251308   10/1989   Japan .
5-74092    3/1993   Japan .
2017674   10/1979   United Kingdom .

*Primary Examiner*—John H. Wolff
*Attorney, Agent, or Firm*—Staas & Halsey

[57] ABSTRACT

A non-magnetic substrate material $Fe_2O_3$ as a major component and 0.1–5 weight %, based on the total amount of the material, of at least one of $Nd_2O_3$ and $Gd_2O_3$. By adding $Nd_2O_3$ and/or $Gd_2O_3$, the maximum size of the grains in the material is regulated to 5 μm or less. This improves the CSS characteristics of a flying-type magnetic head made thereof and makes the flying height low and constant.

16 Claims, 5 Drawing Sheets

NON-MAGNETIC SUBSTRATE MATERIAL AND SLIDER ASSEMBLY FOR USE IN FLYING-TYPE MAGNETIC HEAD

BACKGROUND OF THE INVENTION

The present invention relates to a non-magnetic substrate material containing $Fe_2O_3$ as the major component, and a magnetic head slider assembly made of such a substrate material, in particular, a slider assembly for a flying-type magnetic head showing excellent CSS (Contact Start and Stop) characteristics and being capable of controlling the flying height small and constant.

A small hard disk drive, in which writing and reading data on or from a recording medium such as a magnetic recording disk are performed by a induction type magnetic head, has been widely used as an external storage device for personal computers, work stations, etc.

In recent years, the recording density of a magnetic disk for a small hard disk has been rapidly increased, and also a hard disk drive has been rapidly reduced in its size and weight for applying it to a note-type personal computer. In particular, the increasing rate of the recording density of magnetic disk is surprising and as high as 20–30% a year. This increasing rate is still going high, and it is expected that the recording density will be more accelaratedly increased in future.

However, a hard disk drive has many problems to be solved to meet the recent demand for increasing the recording density. For example, a magnetic head, one of the major components of a hard disk drive, should have a high electromagnetic transducing efficiency with good high-frequency characteristics in addition to a head structure which allows a high linear recording density and a narrow track width. A thin-film induction-type magnetic head and a magnetoresistive magnetic head of separate recording/reading type have a construction which may meet the above demand for increasing recording density. However, there have been unsolved problems such as uncertain property reliability, a high production cost because of a production process including many steps and a complicated structure of such magnetic heads.

A flying-type magnetic head of composite structure is assembled by fixing a magnetic core, which consists of a pair of magnetic core chips bonded each other so as to form a magnetic gap, in a slot of a slider made of a non-magnetic substrate material. The flying-type magnetic head has a simple structure and has been practically used in the art, and further, much reliance has been placed on its performance. However, there remain many technical problems, which are substantially different form those in the thin-film induction-type head, to be solved for greatly increasing the recording density of flying-type magnetic head.

To increase the recording density of the flying-type magnetic head, it has been proposed and practiced to make the magnetic gap width smaller and to make the track width narrower. For this purpose, the flying height, i.e., the space between the magnetic disk surface and the magnetic head during recording/reading operation, is necessary to be reduced. However, a new difficult problem is raised by the reduction in the flying height.

In the flying-type magnetic head presently being put into practical use, the recording density is at most about 300–400 $Mb/in^2$ at a flying height of 0.1 µm or less. A hard disk drive is recently designed so that the flying height of about submicron is maintained during recording/reading operation. However, it is necessary to keep the flying height constant in addition to reducing the flying height in order to attain a high recording density of 400 $Mb/in^2$ or higher, this posing various problem to be solved. For example, as the flying height becomes smaller, the CSS characteristics, which reflect the contact condition between the magnetic head and the magnetic disk, are deteriorated. Since the deterioration in the CSS characteristics directly affect the life time and reliability of a hard disk drive, various proposals have been made.

JP-A-61-146751 discloses a production method of a slider material for a magnetic head of floppy disk drive, which comprises calcining a mixture of $Fe_2O_3$ as the major component and at least one of $Al_2O_3$, $ZrO_2$, $SnO_2$, $CeO_2$, ZnO and $TiO_2$ as the additive component. Although a flying-type slider for a hard disk drive made of the material taught in JP-A-61-146751 has no problem when operated at a flying height corresponding to the conventional recording density, the CSS characteristics are significantly deteriorated when used under a condition for attaining a higher recording density. From the inventors' study, it has been found that such a significant deterioration is attributable to the slider material.

Microscopic examination of the air bearing surface of the slider has revealed the presence of a large number of chips at the edge of the air bearing rails after grinding finish as shown in the microphotograph (×400) of FIG. 7, which shows an air bearing surface near the magnetic gap of a flying-type magnetic head made of the material of JP-A-61-146751. FIG. 9 is a schematic expression of FIG. 7. The white, wide band on an upper side (21 in FIG. 9) is a rail (exposed slider material). The narrow band (12 in FIG. 9) on a lower side, the width of which corresponds to the track width, is a magnetic core exposed forward the air bearing surface, and the grayish bands (18, 18 in FIG. 9) are bonding glass. The longitudinal edge of the air bearing rail is necessary to be made straight and finished precisely. However, as seen from FIG. 7, many chips or cutouts of the slider material are coming up at the longitudinal edge to result in uneven edge contour. From the magnifying power (×400), it has been calculated that most of the chips or cutouts formed as a result of chipping had a depth of 10 µm or more.

Since the CSS characteristics of the flying-type magnetic head depend on various factors, it is usually difficult to specifically find out the cause of deterioration in the CSS characteristics. For example, the flying height relates to such deterioration in complicated manner. It has been known in the art that the flying height varies as the magnetic head moves radially across the magnetic disk. Such variation in the flying height is because that the flying height depends on the relative speed between the magnetic head and the magnetic disk, which is larger at radially outer side.

The variation in the flying height, which depends on the position of the magnetic head over the magnetic disk surface, adversely affects the recording/reading operation. To avoid such variation in the flying height, U.S. Pat. No. 4,673,996 proposes to provide the side edge of each slider rail with a specific transverse pressurization contour. However, it was difficult to produce a slider having the construction and size taught therein from a conventional slider material because of its tendency of easy chipping, failing to obtain alleged effect of U.S. Pat. No. 4,673,996. In particular, the edge had surface irregularities over 10 µm as shown in FIG. 7 and was not precision-finished to give a smooth edge.

Thus, since the conventional slider material is likely to chip from slider edges, the chipping of the edges probably occurs during the assembly of a hard disk drive or through subsequent use thereof. When the minute chipped material enters the space between the magnetic head and the magnetic disk surface, serious troubles such as destruction of stored data, interruption of operating hard disk drive, etc. may be caused to result in low reliability and reduced life time.

JP-A-1-251308 discloses a method for improving the CSS characteristics by sputtering nearly the entire portion of the air bearing surface to provide the surface with a moderate roughness. However, when the conventional slider material was used, a surface roughness of about 10 μm or less in its repetition pitch was not attained, failing to obtain a sufficient improvement.

OBJECT AND SUMMARY OF THE INVENTION

Accordingly, an object of the present invention is to provide a non-magnetic substrate material suitable for a slider of a flying-type magnetic head, which is resistant to chipping and ensures a smooth and precise edge finish surface of the air bearing surface to improve the CSS characteristics.

Another object of the present invention is to provide a slider for a flying-type magnetic head in which the flying height is kept small and constant during the motion of a magnetic head radially across over a magnetic disk surface.

As a result of the intense research in view of the above objects, the inventors have found that the maximum grain size of a $Fe_2O_3$-based sintered material can be controlled to 5 μm or less by adding at least one of $Nd_2O_3$ and $Gd_2O_3$ in an amount of 0.1–5 weight % based on the total amount of $Fe_2O_3$ and the additive or additives. The inventors have further found that the relatively small maximum grain size enables the above $Fe_2O_3$-based sintered material to be subjected to precision finishing and provide the material with a chipping resistance, and as a result thereof, the CSS characteristics of a flying-type magnetic head can be improved to ensure a high density recording density. The present invention has been accomplished based on the above findings.

Thus, in a first aspect of the present invention, there is provided a non-magnetic substrate material comprising $Fe_2O_3$ as a major component and 0.1–5 weight %, based on the total amount of the material, of at least one of $Nd_2O_3$ and $Gd_2O_3$, and having a maximum grain size of 5 μm or less.

A second aspect of the present invention, there is provided a slider assembly made of the non-magnetic substrate material as defined above.

DETAILED DESCRIPTION OF THE INVENTION AND PREFERRED EMBODIMENT

The addition of at least one additive of $Nd_2O_3$ and $Gd_2O_3$ is effective for improving the sintering property of $Fe_2O_3$, specifically, effective for reducing the grain size to 5 μm or less. The addition amount of the additive oxides is 0.1–5 weight %, preferably 0.5–3 weight % based on the total amount of $Fe_2O_3$ and the additive or additives, in view of maintaining the coercive force to 0.1 Oe or less and preventing the grain size from exceeding 5 μm. $Nd_2O_3$ and $Gd_2O_3$ may be added in combination to obtain the effect intended by the present invention.

Figure 2:
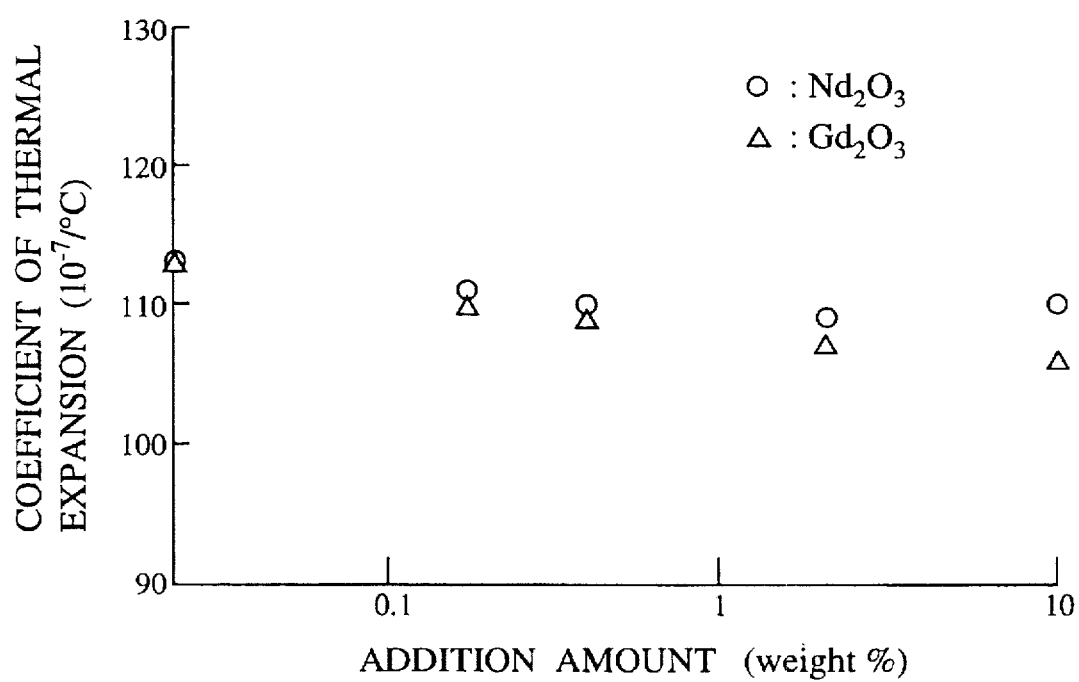
FIG. 2 is a graph showing the effect of the addition amount of $Nd_2O_3$ and $Gd_2O_3$ on the coefficient of thermal expansion of the non-magnetic $Fe_2O_3$-base material.

As shown in FIG. 2, the coefficient of thermal expansion of the non-magnetic substrate material depends on the amount of the additive oxides. A single crystalline ferrite having a coefficient of thermal expansion of about $110 \times 10^{-7}$ to $115 \times 10^{-7}/°C$. has been generally used as the material for the magnetic core. As seen from FIG. 2, when the addition amount is in the range of 0.1–5 weight %, the coefficient of thermal expansion of the non-magnetic substrate material is nearly the same as that of the single crystalline ferrite. This means that the magnetic core is subjected to no undesired stress which may be caused by thermal expansion of a slider and a magnetic core, when the addition amount is in 0.1–5 weight %. Therefore, the addition amount range specified above is critical also in view of attaining good characteristics and high reliability of the magnetic head.

Figure 3:
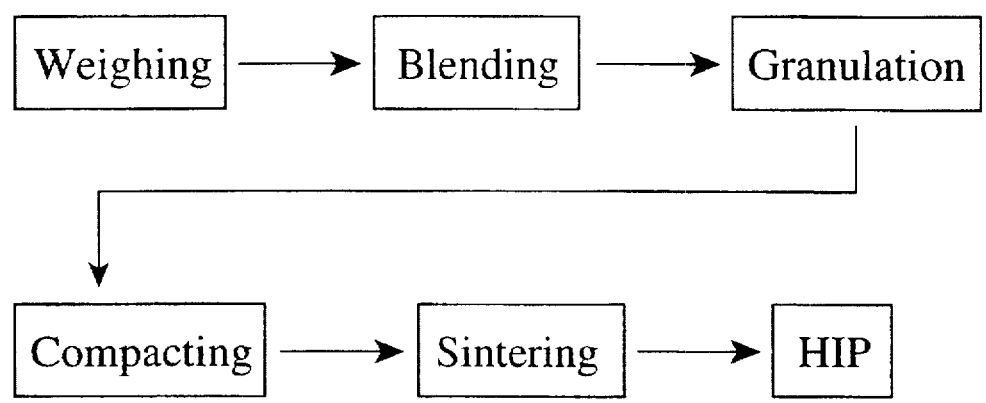
FIG. 3 is a diagram showing the production steps for producing the non-magnetic substrate material of the present invention.

The non-magnetic substrate material may be produced, for example, by the sequential steps as shown in FIG. 3. A predetermined amount of $Fe_2O_3$ and 0.1–5 weight %, based on $Fe_2O_3$, of at least one of $Nd_2O_3$ and $Gd_2O_3$ are wet-blended in a ball mill for, for example, 12 hours while using a solvent such as water. After adding a binder such as polyvinyl alcohol to the resultant blend in an amount of, for example, 1 weight % based on the total of the resultant blend, the resultant blend is granulated by a spray drier, etc. The granulates are then compacted to form a green body under a pressure of 1 to 3 ton/cm² by a hydraulic press. The green body is sintered at 1100° C. for 4 hours in air or in an inert gas atmosphere. The sintered product is densified by being subjected to HIP treatment at 1100° C. under 1000 atm in argon gas atmosphere.

Figure 1:
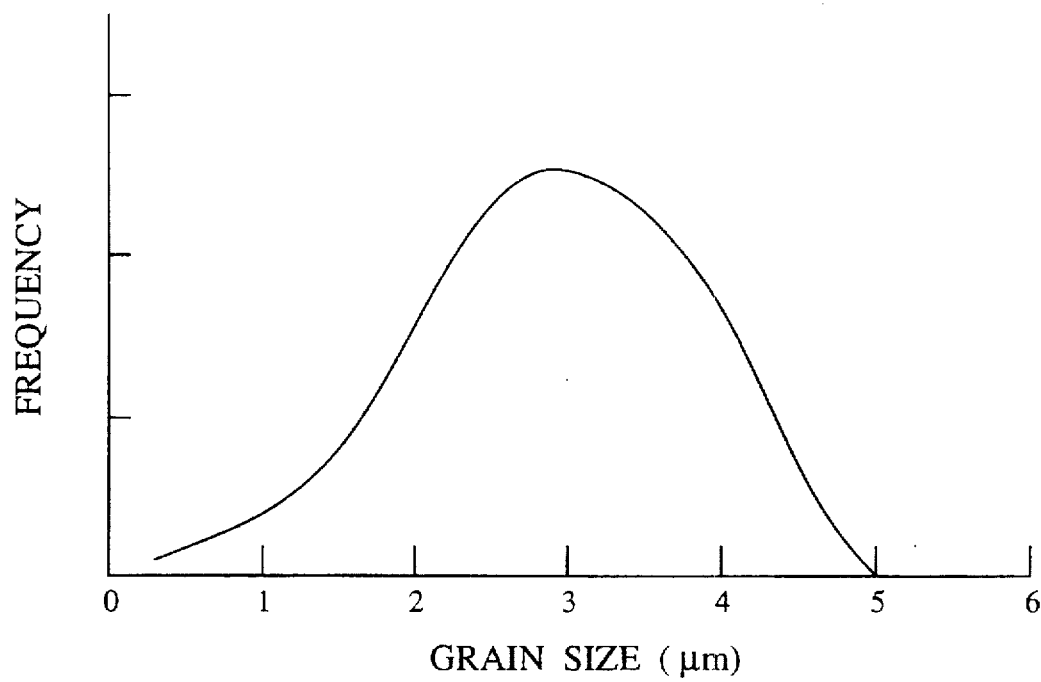
FIG. 1 is a graph showing a grain size distribution of the non-magnetic substrate material of the present invention.

FIG. 1 is a graph showing the grain size distribution of a non-magnetic substrate material containing 0.1 weight % of $Nd_2O_3$ based on the material. As seen from FIG. 1, the size of any grains is 5 μm or less. It should be noted that the similar result was obtained when a addition amount of $Nd_2O_3$ was other than 0.1 weight % in the range of 0.1–5 weight %, or 0.1–5 weight % of $Gd_2O_3$ or 0.1–5 weight % of a combination of $Nd_2O_3$ and $Gd_2O_3$ was added in place of 0.1 weight % of $Nd_2O_3$.

When $Nd_2O_3$ is added to $Fe_2O_3$, a secondary phase of $NdFeO_3$ having perovskite structure is formed in addition to a primary phase. The perovskite phase contributes to reducing the grain size.

The several properties of the non-magnetic substrate materials according to the present invention and the comparative materials are shown in Tables 1 and 2. In the experiments for Table 1, the dependency of the properties on the addition amount of $Nd_2O_3$ was examined. In the experiments for Table 2, the dependency of the properties on the kind of the additives was examined. The procedure for each test is described below.

Maximum Grain Size

Basically according to JIS C2563 (Test Method of Ferrite Core for Magnetic Head).

Vickers Hardness

Basically according to JIS C2563 (Test Method of Ferrite Core for Magnetic Head).

Coefficient of Thermal Expansion

Basically according to JIS C2563 (Test Method of Ferrite Core for Magnetic Head).

Machinability

After subjecting a block of a slider material to grinding process, the ground surface was microscopically observed to measure the frequency of occurrence of cracking or chipping. The surface was classified into three categories according to the extent of occurrence of chips or cutouts having a depth of 10 μm or more, namely, X when many such chips or cutouts were found, Δ when found scatteredly, and ○ when a few was found.

Solvent Resistance

During the production of a slider assembly, the slider material is exposed to a grinding fluid, a lapping fluid, a cleaning fluid, etc. When the surface of the slider material was corroded or a crystal grain was coming off from the surface due to such exposure, the material was evaluated as X, and ○ when corrosion and coming-off were not observed.

Crystallinity

When anomalous grain growth or undesired secondary phase were found under a microscopic observation, X was assigned, and ○ was assigned when such abnormality was not observed.

Magnetization

The magnetization was measured by a vibrating sample magnetometer (VSM), and Δ was assigned when 0.5 G or more and ○ when lower than 0.5 G.

0.1 weight % or more. It would appear that the maximum grain size of 5 μm or less improves the machinability and hardness of the non-magnetic substrate material. Further, it can be seen that a coefficient of thermal expansion of the same level as that of ferrite core material ($110 \times 10^{-7}$ to $115 \times 10^{-7}/°C$.) can be obtained by regulating the addition amount within the range of 0.1–5 weight %.

TABLE 1

| No. | Additive | Addition Amount (weight %) | Maximum Grain Size (μm) | Vickers Hardness (kgf/mm$^2$) | Coefficient of Thermal Expansion ($10^{-7}/°C$.) | CSS Characteristics | Machinability |
|---|---|---|---|---|---|---|---|
| Comparative Example ||||||||
| 1 | none | 0 | 7 | 900 | 116 | ○ | x |
| 2 | $Nd_2O_3$ | 0.05 | 6 | 900 | 116 | ○ | x |
| Example ||||||||
| 1 | $Nd_2O_3$ | 0.1 | 5 | 920 | 115 | ○ | ○ |
| 2 | $Nd_2O_3$ | 0.2 | 4 | 930 | 114 | ○ | ○ |
| 3 | $Nd_2O_3$ | 0.5 | 4 | 950 | 114 | ○ | ○ |
| 4 | $Nd_2O_3$ | 1.0 | 3.5 | 970 | 113 | ○ | ○ |
| 5 | $Nd_2O_3$ | 2.0 | 3.5 | 1000 | 112 | ○ | ○ |
| 6 | $Nd_2O_3$ | 5.0 | 3 | 1050 | 110 | ○ | ○ |
| Comparative Example ||||||||
| 3 | $Nd_2O_3$ | 10.0 | 2.5 | 1100 | 105 | ○ | ○ |

As seen from Table 1, the maximum grain size of 5 μm or less was attained when the addition amount of $Nd_2O_3$ was

TABLE 2

| No. | Additive | Addition Amount (weight %) | Crystalline Structure (secondary phase) | Solvent Resistance | Machinability | Crystallinity | CSS Characteristics | Magnetization |
|---|---|---|---|---|---|---|---|---|
| Example | | | | | | | | |
| 6 | Nd₂O₃ | 5.0 | perovskite | ○ | ○ | ○ | ○ | ○ |
| 7 | Gd₂O₃ | 5.0 | garnet | ○ | ○ | ○ | ○ | ○ |
| Comparative Example | | | | | | | | |
| 1 | none | 0 | — | ○ | x | Δ | ○ | ○ |
| 4 | La₂O₃ | 5.0 | perovskite | x | ○ | ○ | ○ | ○ |
| 5 | Y₂O₃ | 5.0 | garnet | ○ | Δ | ○ | Δ | Δ |
| 6 | Pr₆O₁₁ | 5.0 | garnet | ○ | Δ | ○ | Δ | ○ |
| 7 | CeO₂ | 5.0 | garnet | ○ | Δ | Δ | Δ | ○ |
| 8 | Dy₂O₃ | 5.0 | garnet | ○ | Δ | Δ | Δ | ○ |
| 9 | Sm₂O₃ | 5.0 | garnet | x | Δ | ○ | Δ | Δ |

As seen from Table 2, it would appear that only $Nd_2O_3$ and $Gd_2O_3$ can provide a non-magnetic substrate material with suitable properties as the slider material.

Figure 4:
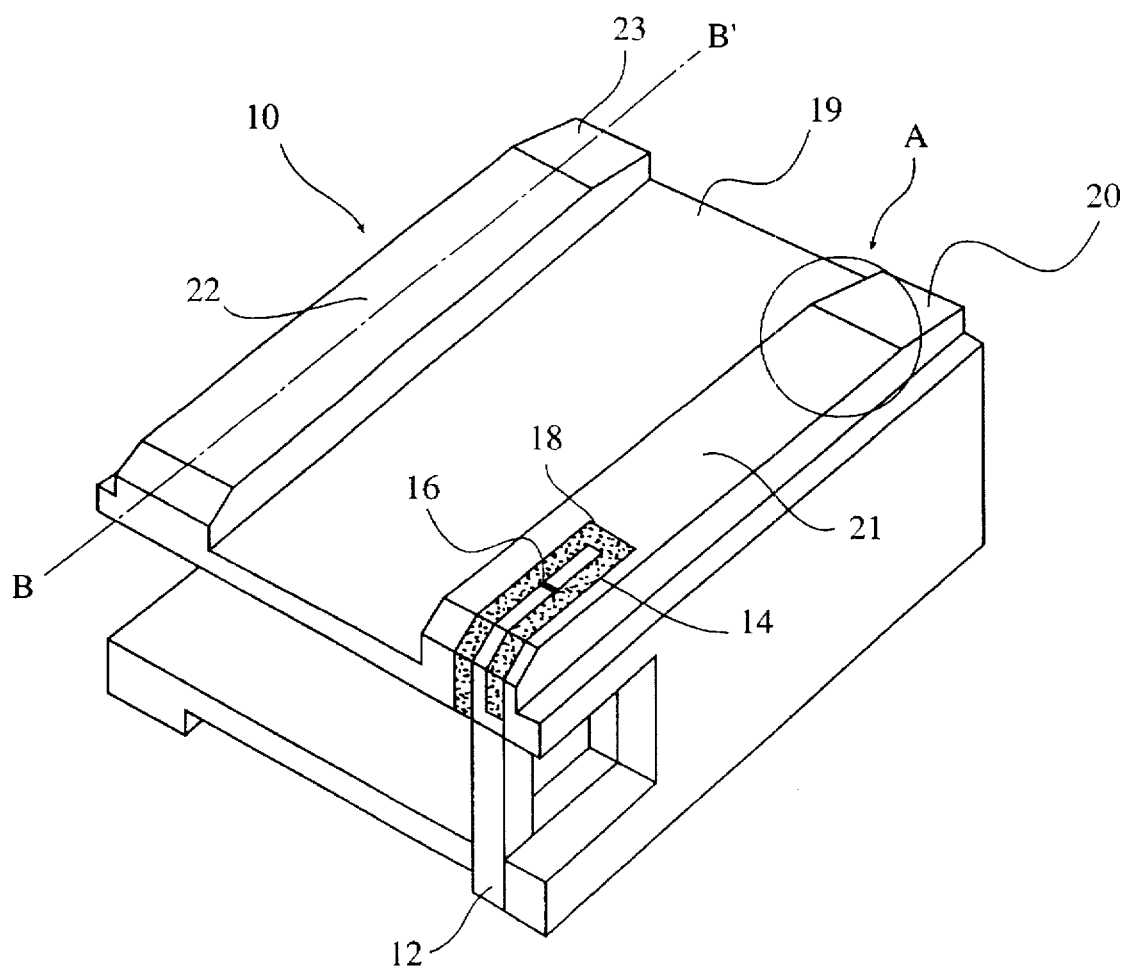
FIG. 4 is a perspective view showing a flying-type composite magnetic head related to the present invention.

FIG. 4 is a perspective view showing a flying-type magnetic head having composite structure to which the non-magnetic substrate material of the present invention is applicable. The flying-type magnetic head comprises a slider 10 and a magnetic core 12. The magnetic core 12 comprises a pair of magnetic core chips bonded each other to form a magnetic gap 16 and a coil (not shown) of desired turns wound thereon. The slider 10 has a pair of parallel rails 21 and 22 formed on an air bearing surface thereof and separated by a recess 19 opening from the front end to the rear end of the slider 10. The surfaces of the rails 21, 22 define air bearing surfaces with the leading edge of the surfaces 20, 23 tapered whereby air entering between the rails 21, 22 and a rotating recording medium causes the magnetic head to lift from the surface of the recording medium. The magnetic core 12 is fixedly mounted in a slot 14 at a trailing edge of the rail 21 with respect to a moving direction of a recording medium with a bonding glass 18 while exposing the magnetic gap 16 toward the air bearing surface. The flying-type magnetic head flies at a very narrow clearance (flying height) above a rotating recording disk surface during a recording/reading operation. Thus, the flying-type magnetic head glides over a rotating disk surface at a small flying height without contacting with the disk surface.

Figure 5:
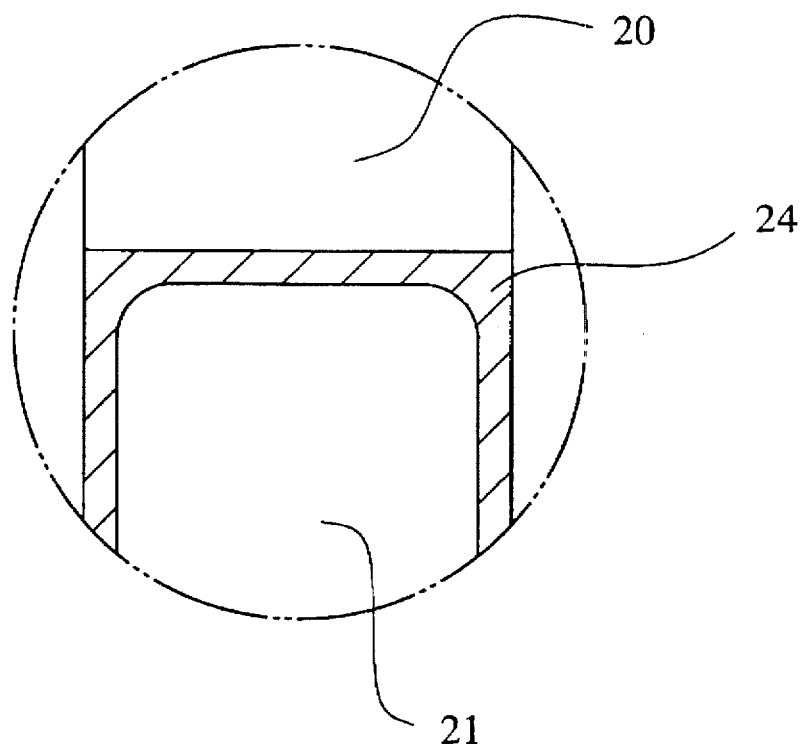
FIG. 5 is an enlarged view of the portion in the circle A of FIG. 4.

The side edges of the rails 21, 22 on the air bearing surface may be chamfered to be provided with straight or round tapers 24, as shown in FIG. 5.

Figure 6:
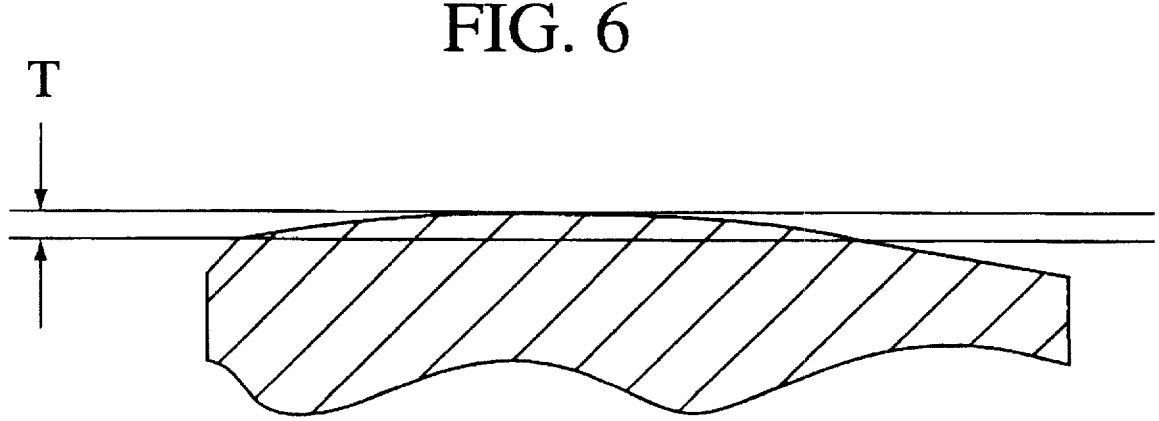
FIG. 6 is a cross sectional view taken along the B–B' line of FIG. 4 and showing the crown of the rail surface.

The air bearing surfaces of the rails 21, 22 may be flat or may be crowned, as shown in FIG. 6, to provide convex cylindrical surfaces (crown surface) with a large curvature along the length of the rails 21, 22 whereby improving the CSS characteristics. Further, the whole part of the air bearing surface may be roughened by sputtering, etc. to provide a surface roughness of 5 μm or less to improve the CSS characteristics.

Figure 7:
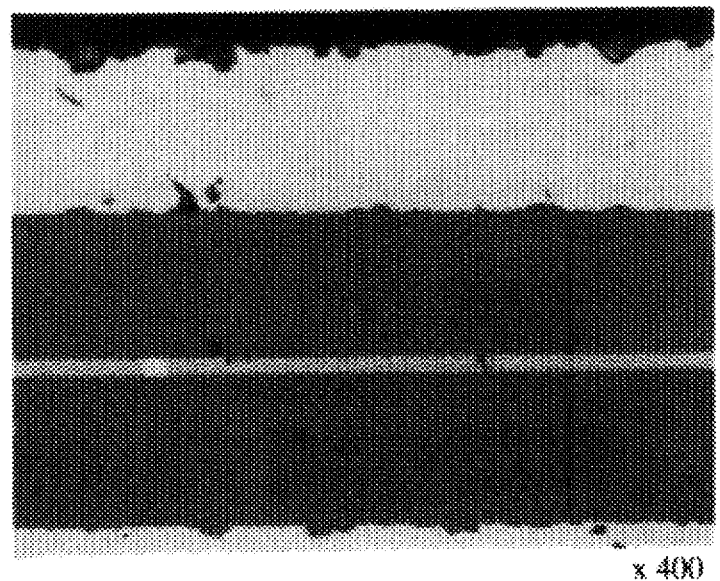
FIG. 7 is a microphotograph showing a rail around a magnetic gap of a magnetic head made of a conventional slider material.
Figure 8:
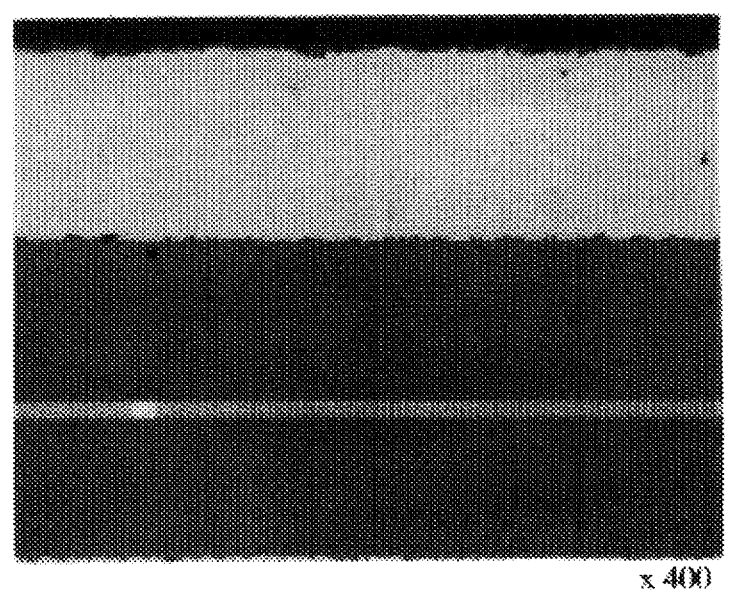
FIG. 8 is a microphotograph showing a rail around a magnetic gap of a magnetic head made of the non-magnetic substrate material of the present invention.
Figure 9:
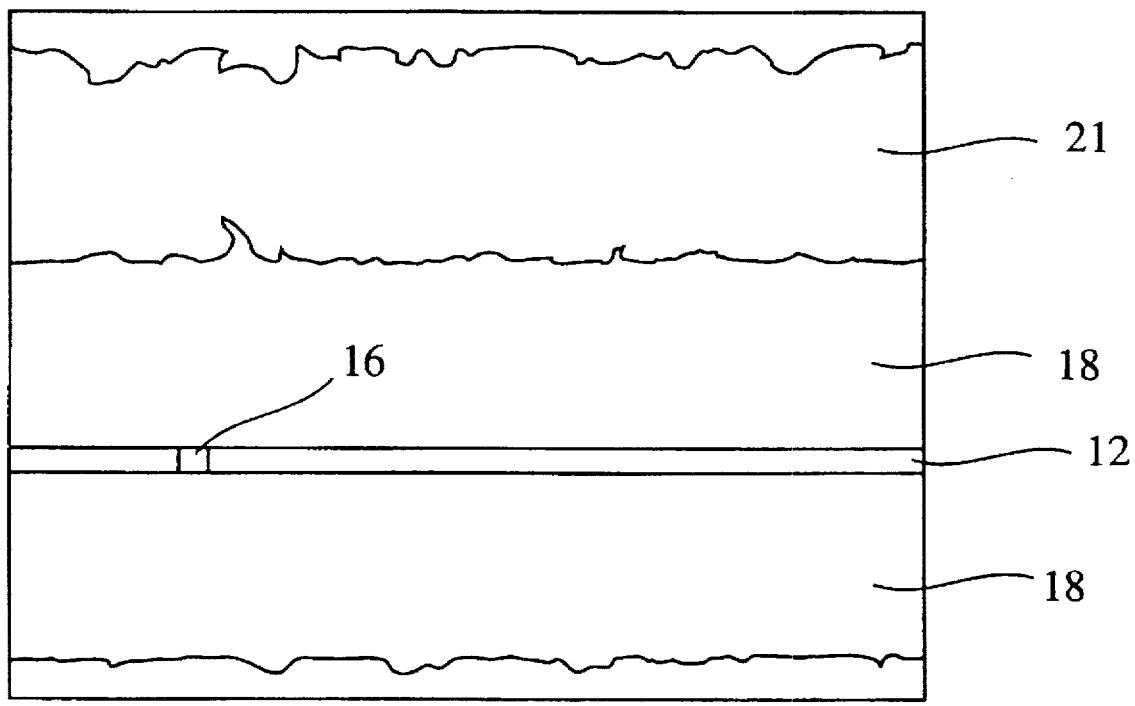
FIG. 9 is a schematic expression of FIG. 7.

FIG. 8 is a microphotograph taken in the same manner as in FIG. 7, which shows an air bearing surface near a magnetic gap of a flying-type magnetic head made of the non-magnetic substrate material of the present invention ($Nd_2O_3$: 0.1 weight %). Upon comparing the broad white bands on upper side of FIGS. 7 and 8, it would appear that the edge of the rail of FIG. 8 is smooth and has no cutout exceeding 5 μm, which may be caused by chipping of the edge.

The effect of the addition amount of $Nd_2O_3$ and the kind of the additive on the CSS characteristics were examined using various flying-type magnetic heads as shown in FIG. 4.

The CSS characteristics were evaluated as follows. Each magnetic head was pressed onto a 3.5-inch hard disk (substrate: aluminum, primer layer: Cr, magnetic layer: sputtered Co-Cr-Ta) rotating at a peripheral speed of 9.4 m/sec via gimbals under a pressure of about 4 gf/cm². The contact start/stop procedure was repeated to measure a torque necessary for starting the rotation of the magnetic disk. The torque was converted to a friction coefficient. The results are shown in Tables 1 and 2 with the ratings ○ which means that the friction coefficient was 1.0 or less after 10,000 repetitions of contact start/stop and Δ which means that the friction coefficient exceeded 1.0 after 10,000 repetitions.

As described above, since the maximum grain size can be regulated to 5 μm or less by adding at least one of $Nd_2O_3$ and $Gd_2O_3$ to $Fe_2O_3$ in an amount of 0.1–5 weight % based on the total amount of $Fe_2O_3$ and the additive or additives, the non-magnetic substrate material of the present invention has been remarkably improved in machinability to ensure precision finish. In particular, since chipping of the material from rail edges hardly occurs, a slider made of the material shows an intended performance, and the flying height is maintained low and stabilized against any change thereof.

What is claimed is:

1. A non-magnetic material for use in a flying type magnetic head, comprising:
   non-magnetic $Fe_2O_3$ as the principal component; and
   0.1–5 weight %, based on the total weight of the non-magnetic material, of at least one of $Nd_2O_3$ and $Gd_2O_3$, the non-magnetic material having a maximum grain size of 5 μm.

2. The non-magnetic material according to claim 1, wherein the non-magnetic material has a coercive force no greater than 0.1 Oe.

3. A non-magnetic material for use in a flying type magnetic head, comprising:
   non-magnetic $Fe_2O_3$ as the principal component; and
   0.1–5 weight %, based on the total weight of the non-magnetic material, of $Nd_2O_3$,
   said non-magnetic material having a maximum grain size of 5 μm, and
   said non-magnetic material containing perovskite-type $NdFeO_3$.

4. The non-magnetic material according to claim 3, wherein the non-magnetic material has a coercive force no greater than 0.1 Oe.

5. A slider assembly for a flying-type magnetic head, comprising:

a slider body formed of a non-magnetic material, the non-magnetic material having non-magnetic $Fe_2O_3$ as the principal component, and 0.1–5 weight %, based on the total weight of the non-magnetic material, of at least one of $Nd_2O_3$ and $Gd_2O_3$, the non-magnetic material having a maximum grain size of 5 μm.

6. The slider assembly according to claim 5, wherein the slider body is part of a flying-type magnetic head which is adapted to move in a defined direction with respect to a magnetic recording medium, the slider body being in the form of a rail having an air bearing top surface, the rail extending along the defined direction and being chamfered to have tapered edges.

7. The slider assembly according to claim 6, wherein the rail has rounded tapered edges.

8. A slider assembly according to claim 6, wherein the rail has straight tapered edges.

9. The slider assembly according to claim 6, wherein said air bearing top surface of the rail has an irregular contour such that a middle portion of the air bearing top surface is raised further from the slider body than end portions of the air bearing top surface.

10. The slider assembly according to claim 6, wherein the air top bearing surface has a surface roughness of no more than 5 μm.

11. The slider assembly according to claim 5, wherein the slider body is part of a flying-type magnetic head which is adapted to move in a defined direction with respect to a magnetic recording medium, the slider body being in the form of a rail having an air bearing top surface, the rail extending along the defined direction and being chamfered to have tapered edges.

12. The slider assembly according to claim 11, wherein the rail has rounded tapered edges.

13. A slider assembly according to claim 11, wherein the rail has straight tapered edges.

14. The slider assembly according to claim 11, wherein said air bearing top surface of the rail has an irregular contour such that a middle portion of the air bearing top surface is raised further from the slider body than end portions of the air bearing top surface.

15. The slider assembly according to claim 11, wherein air bearing top surface has a surface roughness of no more than 5 μm.

16. A slider assembly for a flying-type magnetic head, comprising:

a slider body formed of a non-magnetic material, the non-magnetic material having non-magnetic $Fe_2O_3$ as the principal component, and 0.1–5 weight %, based on the total weight of the non-magnetic material, of $Nd_2O_3$, the non-magnetic material having a maximum grain size of 5 μm, and the non-magnetic material containing perovskite-type $NdFeO_3$.

* * * * *

UNITED STATES PATENT AND TRADEMARK OFFICE
CERTIFICATE OF CORRECTION

PATENT NO. : 5,751,516
DATED : May 12, 1998
INVENTOR(S) : Hideo Nitta, et al.

It is certified that error appears in the above-identified patent and that said Letters Patent is hereby corrected as shown below:

Title page, [75] Inventors: change "Nitta Hideo; Soutome Tomoki" to --Hideo Nitta; Tomoki Soutome--.

Column 10, line 14, (claim 15), after "wherein" insert --the--.

Signed and Sealed this

Twenty-fifth Day of August, 1998

Attest:

BRUCE LEHMAN

Attesting Officer

Commissioner of Patents and Trademarks